United States Patent
Goodman et al.

(10) Patent No.: US 7,464,264 B2
(45) Date of Patent: *Dec. 9, 2008

(54) TRAINING FILTERS FOR DETECTING SPASM BASED ON IP ADDRESSES AND TEXT-RELATED FEATURES

(75) Inventors: Joshua T. Goodman, Redmond, WA (US); Robert L. Rounthwaite, Fall City, WA (US); Geoffrey J. Hulten, Seattle, WA (US); Wen-tau Yih, Champaign, IL (US)

(73) Assignee: Microsoft Corporation, Redmond, WA (US)

( * ) Notice: Subject to any disclaimer, the term of this patent is extended or adjusted under 35 U.S.C. 154(b) by 786 days.

This patent is subject to a terminal disclaimer.

(21) Appl. No.: 10/809,163

(22) Filed: Mar. 25, 2004

(65) Prior Publication Data

US 2004/0260922 A1      Dec. 23, 2004

Related U.S. Application Data

(63) Continuation-in-part of application No. 10/454,168, filed on Jun. 4, 2003, now Pat. No. 7,272,853.

(51) Int. Cl.
*H04L 9/00*        (2006.01)
*G06F 21/00*       (2006.01)
(52) U.S. Cl. ............... 713/154; 713/150; 713/153; 726/3; 726/11; 726/13
(58) Field of Classification Search ........... 713/150, 713/153, 154; 726/3, 11, 13
See application file for complete search history.

(56) References Cited

U.S. PATENT DOCUMENTS 5,377,354 A    12/1994    Scannell et al.

(Continued)

FOREIGN PATENT DOCUMENTS

EP    413 537    2/1991

(Continued)

OTHER PUBLICATIONS

"MIME", The Microsoft Computer Dictionary. 5th ed. Redmond, WA; Microsoft Press. May 1, 2002.

(Continued)

*Primary Examiner*—Nasser G Moazzami
*Assistant Examiner*—Fatoumata Traore
(74) *Attorney, Agent, or Firm*—Amin, Turocy & Calvin, LLP

(57) ABSTRACT

The subject invention provides for an intelligent quarantining system and method that facilitates detecting and preventing spam. In particular, the invention employs a machine learning filter specifically trained using origination features such as an IP address as well as destination feature such as a URL. Moreover, the system and method involve training a plurality of filters using specific feature data for each filter. The filters are trained independently each other, thus one feature may not unduly influence another feature in determining whether a message is spam. Because multiple filters are trained and available to scan messages either individually or in combination (at least two filters), the filtering or spam detection process can be generalized to new messages having slightly modified features (e.g., IP address). The invention also involves locating the appropriate IP addresses or URLs in a message as well as guiding filters to weigh origination or destination features more than text-based features.

44 Claims, 8 Drawing Sheets

U.S. PATENT DOCUMENTS

| | | | |
|---|---|---|---|
| 5,619,648 A | 4/1997 | Canale et al. | |
| 5,638,487 A | 6/1997 | Chigier | |
| 5,704,017 A | 12/1997 | Heckerman et al. | |
| 5,805,801 A | 9/1998 | Holloway et al. | |
| 5,835,087 A | 11/1998 | Herz et al. | |
| 5,884,033 A | 3/1999 | Duvall et al. | |
| 5,905,859 A | 5/1999 | Holloway et al. | |
| 6,003,027 A | 12/1999 | Prager | |
| 6,023,723 A | 2/2000 | McCormick et al. | |
| 6,047,242 A | 4/2000 | Benson | |
| 6,052,709 A | 4/2000 | Paul | |
| 6,072,942 A | 6/2000 | Stockwell et al. | |
| 6,101,531 A | 8/2000 | Eggleston et al. | |
| 6,112,227 A | 8/2000 | Heiner | |
| 6,122,657 A | 9/2000 | Hoffman, Jr. et al. | |
| 6,161,130 A | 12/2000 | Horvitz et al. | |
| 6,167,434 A | 12/2000 | Pang | |
| 6,192,360 B1 | 2/2001 | Dumais et al. | |
| 6,199,102 B1 | 3/2001 | Cobb | |
| 6,266,692 B1 | 7/2001 | Greenstein | |
| 6,308,273 B1 | 10/2001 | Goertzel et al. | |
| 6,314,421 B1 | 11/2001 | Sharnoff et al. | |
| 6,321,267 B1 | 11/2001 | Donaldson | |
| 6,327,617 B1 | 12/2001 | Fawcett | |
| 6,330,590 B1 | 12/2001 | Cotten | |
| 6,370,526 B1 | 4/2002 | Agrawal et al. | |
| 6,393,465 B2 | 5/2002 | Leeds | |
| 6,421,709 B1 | 7/2002 | McCormick et al. | |
| 6,424,997 B1 | 7/2002 | Buskirk, Jr. et al. | |
| 6,434,600 B2 | 8/2002 | Waite et al. | |
| 6,453,327 B1 | 9/2002 | Nielsen | |
| 6,477,551 B1 | 11/2002 | Johnson et al. | |
| 6,484,197 B1 | 11/2002 | Donohue | |
| 6,484,261 B1 | 11/2002 | Wiegel | |
| 6,505,250 B2 | 1/2003 | Freund et al. | |
| 6,546,416 B1 | 4/2003 | Kirsch | |
| 6,592,627 B1 | 7/2003 | Agrawal et al. | |
| 6,615,242 B1 | 9/2003 | Riemers | |
| 6,633,855 B1 | 10/2003 | Auvenshine | |
| 6,643,686 B1 | 11/2003 | Hall | |
| 6,654,787 B1 | 11/2003 | Aronson et al. | |
| 6,684,201 B1 | 1/2004 | Brill et al. | |
| 6,691,156 B1 | 2/2004 | Drummond et al. | |
| 6,701,350 B1 | 3/2004 | Mitchell | |
| 6,701,440 B1 | 3/2004 | Kim et al. | |
| 6,728,690 B1 | 4/2004 | Meek et al. | |
| 6,732,149 B1 | 5/2004 | Kephart | |
| 6,732,157 B1 | 5/2004 | Gordon et al. | |
| 6,732,273 B1 | 5/2004 | Byers | |
| 6,742,047 B1 | 5/2004 | Tso | |
| 6,748,422 B2 | 6/2004 | Morin et al. | |
| 6,751,348 B2 | 6/2004 | Buzuloiu et al. | |
| 6,757,830 B1 | 6/2004 | Tarbotton et al. | |
| 6,768,991 B2 | 7/2004 | Hearnden | |
| 6,775,704 B1 | 8/2004 | Watson et al. | |
| 6,779,021 B1 | 8/2004 | Bates et al. | |
| 6,785,820 B1 | 8/2004 | Muttik | |
| 6,842,773 B1 | 1/2005 | Ralston et al. | |
| 6,853,749 B2 | 2/2005 | Watanabe et al. | |
| 6,915,334 B1 | 7/2005 | Hall | |
| 6,920,477 B2 | 7/2005 | Mitzenmacher | |
| 6,928,465 B2 | 8/2005 | Earnest | |
| 6,971,023 B1 | 11/2005 | Markinson et al. | |
| 7,003,555 B1 * | 2/2006 | Jungck | 709/219 |
| 7,032,030 B1 | 4/2006 | Codignotto | |
| 7,051,077 B2 | 5/2006 | Lin | |
| 7,117,358 B2 | 10/2006 | Bandini et al. | |
| 7,155,243 B2 | 12/2006 | Baldwin et al. | |
| 7,155,484 B2 | 12/2006 | Malik | |
| 7,188,369 B2 | 3/2007 | Ho et al. | |
| 7,219,148 B2 | 5/2007 | Rounthwaite et al. | |
| 7,263,607 B2 | 8/2007 | Ingerman et al. | |
| 7,293,063 B1 | 11/2007 | Sobel | |
| 2001/0046307 A1 | 11/2001 | Wong | |
| 2002/0016956 A1 | 2/2002 | Fawcett | |
| 2002/0034186 A1 * | 3/2002 | Huang | 370/401 |
| 2002/0059425 A1 | 5/2002 | Belfiore et al. | |
| 2002/0073157 A1 | 6/2002 | Newman et al. | |
| 2002/0091738 A1 | 7/2002 | Rohrabaugh et al. | |
| 2002/0124025 A1 | 9/2002 | Janakiraman et al. | |
| 2002/0147782 A1 | 10/2002 | Dimitrova et al. | |
| 2002/0174185 A1 | 11/2002 | Rawat et al. | |
| 2002/0184315 A1 | 12/2002 | Earnest | |
| 2002/0199095 A1 * | 12/2002 | Bandini et al. | 713/151 |
| 2003/0009495 A1 | 1/2003 | Adjaoute | |
| 2003/0009698 A1 | 1/2003 | Lindeman et al. | |
| 2003/0016872 A1 | 1/2003 | Sun | |
| 2003/0037074 A1 | 2/2003 | Dwork et al. | |
| 2003/0041126 A1 | 2/2003 | Buford et al. | |
| 2003/0088627 A1 * | 5/2003 | Rothwell et al. | 709/206 |
| 2003/0149733 A1 | 8/2003 | Capiel | |
| 2003/0167311 A1 | 9/2003 | Kirsch | |
| 2003/0191969 A1 | 10/2003 | Katsikas | |
| 2003/0200541 A1 | 10/2003 | Cheng et al. | |
| 2003/0204569 A1 | 10/2003 | Andrews et al. | |
| 2003/0229672 A1 | 12/2003 | Kohn | |
| 2004/0003283 A1 | 1/2004 | Goodman et al. | |
| 2004/0015554 A1 | 1/2004 | Wilson | |
| 2004/0054887 A1 | 3/2004 | Paulsen et al. | |
| 2004/0073617 A1 | 4/2004 | Milliken et al. | |
| 2004/0083270 A1 | 4/2004 | Heckerman et al. | |
| 2004/0093371 A1 | 5/2004 | Burrows et al. | |
| 2004/0139160 A1 | 7/2004 | Wallace et al. | |
| 2004/0139165 A1 | 7/2004 | McMillan et al. | |
| 2004/0148330 A1 | 7/2004 | Alspector et al. | |
| 2004/0177120 A1 | 9/2004 | Kirsch | |
| 2004/0199585 A1 | 10/2004 | Wang | |
| 2004/0199594 A1 | 10/2004 | Radatti et al. | |
| 2004/0210640 A1 | 10/2004 | Chadwick et al. | |
| 2004/0255122 A1 | 12/2004 | Ingerman et al. | |
| 2004/0260776 A1 | 12/2004 | Starbuck et al. | |
| 2005/0015455 A1 | 1/2005 | Liu | |
| 2005/0050150 A1 | 3/2005 | Dinkin | |
| 2005/0060643 A1 | 3/2005 | Glass et al. | |
| 2005/0076084 A1 | 4/2005 | Loughmiller et al. | |
| 2005/0080855 A1 | 4/2005 | Murray | |
| 2005/0080889 A1 | 4/2005 | Malik et al. | |
| 2005/0081059 A1 | 4/2005 | Bandini et al. | |
| 2005/0091321 A1 | 4/2005 | Daniell et al. | |
| 2005/0097174 A1 | 5/2005 | Daniell | |
| 2005/0114452 A1 | 5/2005 | Prakash | |
| 2005/0120019 A1 | 6/2005 | Rigoutsos et al. | |
| 2005/0159136 A1 | 7/2005 | Rouse et al. | |
| 2005/0160148 A1 | 7/2005 | Yu | |
| 2005/0165895 A1 | 7/2005 | Rajan et al. | |
| 2005/0182735 A1 | 8/2005 | Zager et al. | |
| 2005/0188023 A1 | 8/2005 | Doan et al. | |
| 2005/0204159 A1 | 9/2005 | Davis et al. | |
| 2006/0031303 A1 | 2/2006 | Pang | |
| 2006/0031306 A1 | 2/2006 | Haverkos | |
| 2006/0036701 A1 | 2/2006 | Bulfer et al. | |
| 2006/0123083 A1 | 6/2006 | Goutte et al. | |
| 2006/0265498 A1 | 11/2006 | Turgeman et al. | |
| 2007/0130350 A1 | 6/2007 | Alperovitch et al. | |
| 2007/0130351 A1 | 6/2007 | Alperovitch et al. | |
| 2007/0133034 A1 | 6/2007 | Jindal et al. | |

FOREIGN PATENT DOCUMENTS

| | | |
|---|---|---|
| EP | 720 333 | 7/1996 |
| EP | 1376427 | 3/2003 |
| EP | 1376427 A2 | 1/2004 |
| EP | 1376427 A3 | 1/2004 |
| WO | WO 96/35994 | 11/1996 |

| | | |
|---|---|---|
| WO | 9967731 | 12/1999 |
| WO | WO 02/071286 | 9/2002 |
| WO | 03054764 | 7/2003 |
| WO | WO 2004/059506 | 7/2004 |

OTHER PUBLICATIONS

Ron White, How Computers Work, 2004, QUE Publishing, pp. 238-239.
Michael S. Mimoso, "Quick Takes: Image Analysis, Filtering Comes to E-Mail Security", http://searchsecurity.techtarget.com/originalContent.html (Feb. 5, 2002).
"Clearswift Announces the Most Complete e-Policy-Based Email Content Security Product for Service Providers", http://www.clearswift.com/news/item.aspx?ID=144. (Oct. 12, 2002).
European Search report dated Feb. 23, 2007, mailed Feb. 28, 2007 for European Patent Application Serial No. 05105308, 4 pages.
European Search Report dated Jul. 5, 2006, mailed Jul. 24, 2006 for European Application No. EP 06 01 2631, 3 pages.
Federal Trade Commission. "False Claims in Spam", A report by the FTC's division of marketing practices, Apr. 30, 2003, http://www.ftc.gov/reports/spam/030429spamreport.pdf.
Hansell. "Internet is losing ground in battle against spam", The New York Times: Technology section, Apr. 22, 2003, 2003.
Cynthia Dwork, et al.; "Pricing Via Processing or Combatting Junk Mail"; Presented at Crypto '92; pp. 1-11.
Thorsten Joachims; "Text Categorization with Support Vector Machines: Learning with Many Relevant Features"; LS-8 Report 23, Nov. 1997, 18 pages.
Daphne Koller, et al.; "Hierarchically Classifying Doucments Using Very Few Words"; In ICML-97: Proceedings of the Fourteenth International Conference on Machine Learning; San Francisco, CA: Morgan Kaufmann 1997; 9 pages.
Ellen Spertus; "Smokey: Automatic Recognition of Hostile Messages"; Proceedings of the Conference on Innovative Applications in Artificial Intelligence (IAAI), 1997, 8 pages.
Hinrich Schutze, et al.; "A Comparison of Classifiers and Document Representations for the Routing Problem"; Proceedings of the 18th Annual International ACM SIGIR Conference on Research and Development in Information Retrieval, Seattle, WA, Jul. 9-13, 1995; pp. 229-237.
Yiming Yang, et al.; "A Comparative Study on Feature Selection in Text Categorizatin"; School of Computer Science, Carnegie Mellon University, Pittsburgh, PA, and Verity, Inc., Sunnyvale, CA; 9 pages.
David D. Lewis, et al.; "A Comparison of Two Learning Algorithms for Text Categorization"; Third Annual Symposium on Document Analysis and Information Retrieval; Apr. 11-13, 1994; pp. 81-93.
Mehran Sahami; "Learning Limited Dependence Bayesian Classifiers"; In KDD-96: Proceedings of the Second International Conference on Knowledge Discovery and Data Mining; AAAI Press, 1996; Menlo Park, CA; pp. 335-338.
William W. Cohen; "Learning Rules that Classify E-Mail"; In the Proceedings of the 1996 AAAI Spring Symposium on Machine Learning in Information Access. Downloaded from William Cohen's web page: http://www.research.att.com/nwcohen/pubs.html.
Makoto Iwayama, et al., Hierarchical Bayesian Clustering for Automatic Text Classifiation, Natural Language, 1995, pp. 1322-1327.
David D. Lewis, An Evaluation of Phrasal and Clustered Representations on a Text Categorization Task, 15th Annual International SIGIR '92, Denmark 1992, pp. 37-50.
Daphne Koller, et al, Toward Optimal Feature Selection, Machine Learning Proc. of the Thirteenth International Conference, Morgan Kaufmann, 1996, 9 pages.
David Dolan Lewis, Representation and Learning in Information Retrieval, University of Massachusetts, 1992.
Tom Mitchell, Machine Learning, Carnegie Mellon University, Bayesian Learning, Chapter 6, pp. 180-184.
Y. H. Li, et al., Classification of Text Documents, The Computer Journal, vol. 41, No. 8, 1998; pp. 537-546.
Juha Takkinen, et al., Cafe: A Conceptual Model for Managing Information in Electronic Mail, Laboratory for Intelligent Information Systems, Department of Computer and Information Science, Linkoping University, Sweden, Conference on System Sciences, 1998 IEEE.

Jacob Palme, et al., Issues When Designing Filters In Messaging Systems, Computer Communications, 1996, pp. 95-101, Stockholm, Sweden.
Richard B. Segal, et al., SwiftFile: An Intelligent Assistant for Organizing E-Mail, In Proceedings of the Third International Conference on Autonomous Agents, May 1999, 7 pages.
Mehran Sahami, et al., A Bayesian Approach to Filtering Junk E-mail, AAAI Workshop on Learning for Text Categorization, Jul. 1998, 8 pages, Madison, Wisconsin, USA.
David Madigan, Statistics and The War on Spam, Rutgers University, pp. 1-13, 2003.
Padraig Cunningham, et al., A Case-Based Approach to Spam Filtering that Can Track Concept Drift, In The ICCBR'03 Workshop on Long-Lived CBR Systems, Jun. 2003, 9 pages, Trondheim, Norway.
Mark Rosen, E-mail Classification in the Haystack Framework, Massachusetts Institute of Technology, Feb. 2003, 103 pages.
D. Turner et al., Payment-based Email, 5th International Conference on Software Engineering, Artificial Intelligence, Networking, and Parallel/Distributed Computing, Jun. 2004, 7 pages.
John Wong, Preventing Spams and Relays, Linux Journal, Dec. 1998, 6 pages, vol. 1998 Issue 56es, Specialized Systems Consultants, Inc.
Meng Weng Wong, SPF Overview, Linux Journal, Apr. 2004, 6 pages, vol. 2004 Issue 120, Specialized Systems Consultants, Inc.
Stop, in the Name of Spam, Communications of the ACM, Nov. 1998, pp. 11-14, vol. 41 No. 11.
Eric Allman, Spam, Spam, Spam, Spam, Spam, the FTC, and Spam, Queue, Sep. 2003, pp. 62-69, vol. 1 Issue 6.
Tom Fawcett, "In vivo" Spam Filtering: A Challenge Problem for KDD, SIGKDD Explorations, Dec. 2003, pp. 140-148, vol. 5 Issue 2.
J.D.M. Rennie. ifile: An Application of Machine Learning to E-Mail Filtering, Proceedings of the KDD-2000 Workshop on Text Mining, Sixth ACM SIGKDD International Conference on Knowledge Discovery and Data Mining, 2000. 6 pages.
S. Argamon, et al., Routing documents according to style, In First International Workshop on Innovative Information Systems, 1998, 8 pages.
K. Mock, An Experimental Framework for Email Categorization and Management, Proceedings of the 24th Annual International ACM SIGIR Conference, 2001, pp. 392-393.
Jose Maria Gomez Hidalgo, Evaluating Cost-Sensitive Unsolicited Bulk Email Categorization, SAC 2002, 2002, pp. 615-620, Madrid, Spain.
A.Z. Broder, et al. Syntactic Clustering of the Web, SRC Technical Note, Digital Corporation, Jul. 25, 1997, 13 pages.
I. Androutsopoulos,et al., An Experimental Comparison of Naive Bayesian and Keyword-based Anti-spam Filtering with Personal E-mail Messages, Proceedings of the 23rd ACM SIGIR Conference, 2000, pp. 160-167.
P. Pantel, et al., SpamCop: A Spam Classification & Organization Program, In Proc. AAAI-1998 Workshop on Learning for Text Categorization, 1998, 8 pages.
G. Manco, et al., Towards an Adaptive Mail Classifier, In Proc. of Italian Association for Artificial Intelligence Workshop, 2002, 12 pages.
Cormac O'Brien, et al., Spam Filters: Bayes vs. Chi-squared; Letters vs. Words, Proceedings of the 1st international symposium on Information and communication technologies, 2003, pp. 291-296, Dublin, Ireland.
Olle Balter, et al., Bifrost Inbox Organizer: Giving users control over the inbox, NordiCHI Oct. 2002, 2002, pp. 111-118, Arhus, Denmark.
Lorrie Faith Cranor, et al., Spam!, Communications of the ACM, 1998, pp. 74-83, vol. 41- No. 8.
P.Y. Simard, et al., Using Character Recognition and Segmentation to Tell Computer from Humans, International Conference on Document Analysis and Recogntion (ICDAR), IEEE Computer Society, 2000, pp. 418-423.
S. Li et al., Secure Human-Computer Identification against Peeping: A Survey, Microsoft Research, 2003, 53 pages.
D.A. Turner et al., Controlling Spam through Lightweight Currency, In Proc. of the Hawaii International Conference on Computer Sciences, Jan. 2004, 9 pages.
European Search Report, EP31087TE900, mailed Nov. 11, 2004.
J. Byrne, My Spamblock, Google, Jan. 19, 1997, 2 pages.

D. F. Skoll, How to Make Sure a Human is Sending You Mail, Google, Nov. 17, 1996, 2 pages.

L. M. Bowman, Hotmail Spam Filters Block Outgoing E-mail, CNET NEWS.com, Jan. 18, 2001, 3 pages.

Yu Wu, et al., A New Anti-Spam Filter Based on Data Mining and Analysis of Email Security, Conference Proceedings of the SPIE, Data Mining and Knowledge Discovery Theory, Tools and Technology V, vol. 5098, Apr. 21, 2003. pp. 147-154, Orlando, FL, USA.

Massey, B., et al., Learning Spam: Simple Techniques for Freely-Available Software, Proceedings of Freenix Track 2003 Usenix Annual Technical Conference, Online!, Jun. 9, 2003, pp. 63-76, Berkley, CA, USA.

Graham, P., The Future of Spam, Computer Security Journal, CSI Computer Security Institute, vol. 19, No. 1, Jan. 2003, pp. 1-5.

Graham, P., A Plan for Spam, Online!, Aug. 2002, XP002273602, http://www.paulgraham.com/spam.html, retrieved on Mar. 12, 2004.

Written Opinion of the International Preliminary Examining Authority mailed Nov. 30, 2005 for PCT/US03/41526, 5 pages.

International Search Report dated Jan. 17, 2006, mailed Jan. 31, 2006, for PCT Application Serial No. PCT/US04/05501. 2 Pages.

European Search Report dated Apr. 6, 2006 and mailed Apr. 6, 2006 for EP 04102242, 3 pages.

Graham. "The Future of SPAM" (2003) Computer Journal, CSI Computer Security Institute, vol. 19, No. 1, 6 pages.

U.S. Appl. No. 10/208,150, filed Jul. 29, 2002, Andaker.

U.S. Appl. No. 09/893,941, filed Jun. 28, 2001, Horvitz.

U.S. Appl. No. 10/278,591, filed Oct. 23, 2002, Heckerman.

U.S. Appl. No. 10/180,565, filed Jun. 26, 2002, Goodman.

U.S. Appl. No. 09/497,992, filed Feb. 04, 2000, Maller.

U.S. Appl. No. 10/291,260, filed Nov. 08, 2002, Burrows.

Breiman, Friedman, Olshen, and Stone. "Classification and Regression Trees." Wadsworth & Brooks, Monterey, CA (1984).

Quinlan. "c4.5; Programs for Machine Learning." Morgan Kaufmann, San Francisco, CA (1993).

Hayes, Brian."Spam, Spam, Spam, Lovely Spam." American Scientist Online, Jun. 30, 2003. pp. 1-6. vol 91.

Partial European Search Report, EP05100847, mailed Jun. 21, 2005, 5 pages.

European Search Report, dated Jun. 9, 2005, mailed Aug. 22, 2005 for European Patent Application Serial No. EP04011978, 12 pages.

Kevin R. Gee, Using Latent Semantic Indexing to Filter Spam, SAC 2003, 2003, pp. 460-464, Melbourne, Florida, USA.

Fabrizio Sebastiani. Machine Learning in Automated Text Categorization. ACM Computing Surveys, vol. 34 Issue 1, pp. 1-47, 2002.

I. Androutsopoulos, et al., Learning to Filter Spam E-mail: A Comparison of a Naive Bayesian and a Memory-based Approach, PKDD-2000, Sep. 2000, 13 pages, Lyon, France.

Thorsten Joachims. Transductive Inference for Text Classification using Support Vector Machines. Proceedings of the 16th International Conference on Machine Learning, 1999. 10 pages.

\* cited by examiner

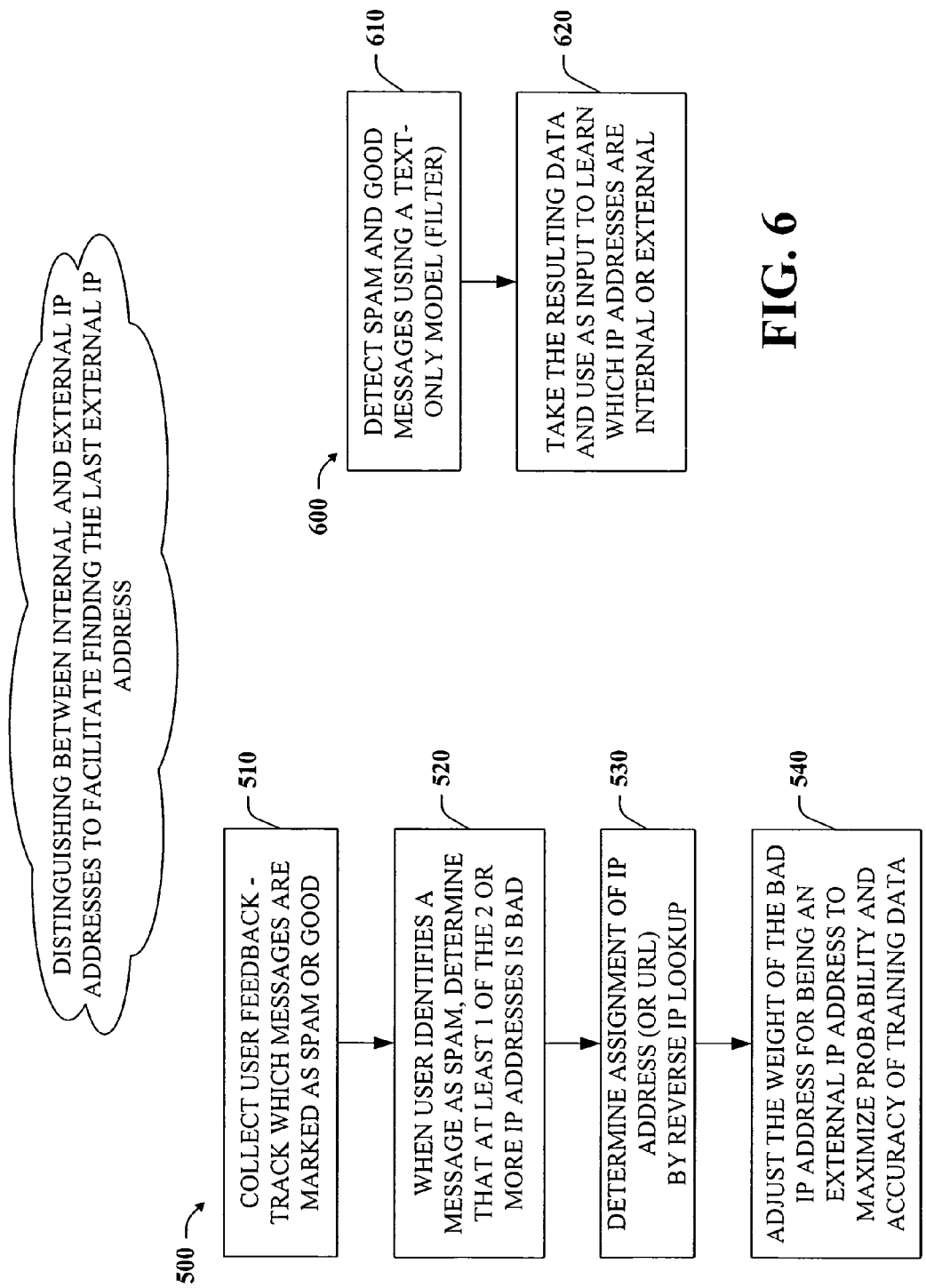

US 7,464,264 B2

TRAINING FILTERS FOR DETECTING SPASM BASED ON IP ADDRESSES AND TEXT-RELATED FEATURES

CROSS REFERENCE TO RELATED APPLICATION

This application is a continuation-in part of U.S. application Ser. No. 10/454,168, entitled Origination/Destination Features and Lists For Spam Prevention and filed on Jun. 4, 2003 now U.S. Pat. No. 7,272,853, the entirety of which is incorporated herein by reference.

TECHNICAL FIELD

This invention is related to systems and methods for identifying both legitimate (e.g., good mail) and undesired information (e.g., junk mail), and more particularly to detecting spam messages in part by scanning messages using a filter trained on IP address or URL features and another filter independently trained on text-related features and/or other features extractable from a message.

BACKGROUND OF THE INVENTION

The advent of global communications networks such as the Internet has presented commercial opportunities for reaching vast numbers of potential customers. Electronic messaging, and particularly electronic mail ("email"), is becoming increasingly pervasive as a means for disseminating unwanted advertisements and promotions (also denoted as "spam") to network users.

The Radicati Group, Inc., a consulting and market research firm, estimates that as of August 2002, two billion junk e-mail messages are sent each day—this number is expected to triple every two years. Individuals and entities (e.g., businesses, government agencies) are becoming increasingly inconvenienced and oftentimes offended by junk messages. As such, spam is now or soon will become a major threat to trustworthy computing.

A key technique utilized to thwart spam is employment of filtering systems/methodologies. One proven filtering technique is based upon a machine learning approach—machine learning filters assign to an incoming message a probability that the message is spam. In this approach, features typically are extracted from two classes of example messages (e.g., spam and non-spam messages), and a learning filter is applied to discriminate probabilistically between the two classes. Since many message features are related to content (e.g., words and phrases in the subject and/or body of the message), such types of filters are commonly referred to as "content-based filters".

With the onslaught of such spam filtering techniques, many spammers have thought of ways to disguise their identities to avoid and/or bypass spam filters. Thus, conventional content-based and adaptive filters may become ineffective in recognizing and blocking disguised spam messages.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method that facilitate distinguishing between spam and good messages in part by employing various smoothing techniques to place less emphasis on making weights associated with origination or destination features small and more emphasis on making weights associated with words small. As a result, a machine learning filter can rely more on internet protocol (IP) addresses, for example, since they may need to see them fewer times than words to give them a higher weight.

According to one aspect of the present invention, the system and method provide for a machine learning filter that utilizes origination features such as IP addresses and/or destination features such as universal resource locators (URLs) apart or independently from other features such as text-based features (e.g., key words or phrases). In particular, at least two filters can be trained independently of the other to handle different features. For example, a first filter can be trained on only origination or destination features and any other relevant features can be learned by a second filter, such that the training of the first filter does not influence the training of the second filter, or vice versa.

Messages can be subjected to at least one of the two filters, depending on the particular feature in focus or the most relevant feature in the particular message. For instance, imagine that the feature in focus is an IP address or a URL. Thus, one of the at least two filters can be trained on IP addresses or URLs and the other on non-IP address or non-URL features (e.g., text, key words, character strings, etc.).

Spammers typically send out the same message over and over again from a known IP address; however every few weeks, spammers can send the same message but from a different or new IP address. Had the IP address stayed the same on the current message, one filter trained only on known IP addresses (e.g., known to be spam or known to be good) could have readily identified the message as spam. However, because the IP address is now unknown, a filter trained only on text-related or other features can be employed to determine whether the message is spam. Thus, two different filters can be trained for different features. As a result, the present invention can better generalize to cases when the IP address or URL is known or unknown.

Alternatively or in addition, the two filters can be used together either concurrently or consecutively to scan for the different features without any undue influence from or reliance on the other. For example, imagine that a spammer is sending "get out of debt" spam from a particular IP address and imagine that a filter has learned that this IP address is a near perfect indicator of whether such messages are spam. In addition, a second filter has learned that key words or phrases such as "out of debt" "debt" "relief" and "free quote" included in the message are also strongly indicative of spam. By combining the results of both filters, a spam prevention system can better distinguish between legitimate messages and spam, thereby improving spam catch rates.

Another approach involves training multiple models of a filter. For example, one can be trained using IP addresses, another can be trained using the top (first) 24 bits of IP addresses, and yet another can be trained using the top 16 bits of IP addresses (or some number of bits less than 32 bits). For instance, if there is insufficient data on a particular IP address but the filter or model has observed several messages with the top 24 bits of that IP address, the model trained using the top 24 bits can be selected to scan or "filter" the IP address data that is on hand. Thus, multiple models can be trained such that only a specific model for which there is sufficient training data is used. This is also applicable to domain names.

According to a further aspect of the invention, the ambiguity of origination or destination features in messages can be resolved to a large extent so that a machine learning filter can appropriately and accurately identify the relevant features to determine whether the message is spam. This can referred to as the ambiguity problem.

The ambiguity problem can arise with respect to URLs as well as IP addresses. Any number of URLs can be added to a spam message in order to mislead and confuse a filter. A conventional filter may not be able to tell which URL is the relevant destination feature of the message. Hence, an accurate determination as to whether the message is spam can be compromised and perhaps unattainable the majority of the time. With respect to IP addresses, most clients cannot decipher which is the last IP address external to the system, the identification of which can be important to classify the message as spam or legitimate. To address either situation, various heuristics and/or algorithmic functions can be employed to learn the worst scoring IP address as well as to optimize or maximize accuracy of training data. In addition, user feedback as to which messages are marked as spam and which are marked as good can also be collected and used as input for a machine learning filter to at least facilitate determining which IP addresses or URLs appear to be spam or legitimate.

As previously mentioned, the IP address and/or URL features may be the most valuable features extractable from a message for spam classification and prevention. However, machine learning filters can have no way of knowing this and in most cases, may assign equal or comparable weights to an IP address in a message as well as to the words in the message. Most machine learning systems provide some type of technique to smooth their parameters. The present invention also facilitates modifying the smoothing or regularization techniques so that IP addresses and URLs are counted as more valuable.

Furthermore, it should be appreciated that various aspects of the present invention can be used in conjunction with a feedback loop, in which users who opt-in provide feedback regarding messages they have received to a machine learning system to affect filter updates and the like.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 5 is a flow diagram of an exemplary method for distinguishing between internal and external IP addresses to facilitate determining the last external IP address in accordance with an aspect of the present invention. The method is also applicable to URLs.

FIG. 6 is a flow diagram of an exemplary method for distinguishing between internal and external IP addresses to facilitate determining the last external IP address in accordance with an aspect of the present invention. The method is also applicable to URLs.

DETAILED DESCRIPTION OF THE INVENTION

Figure 1:
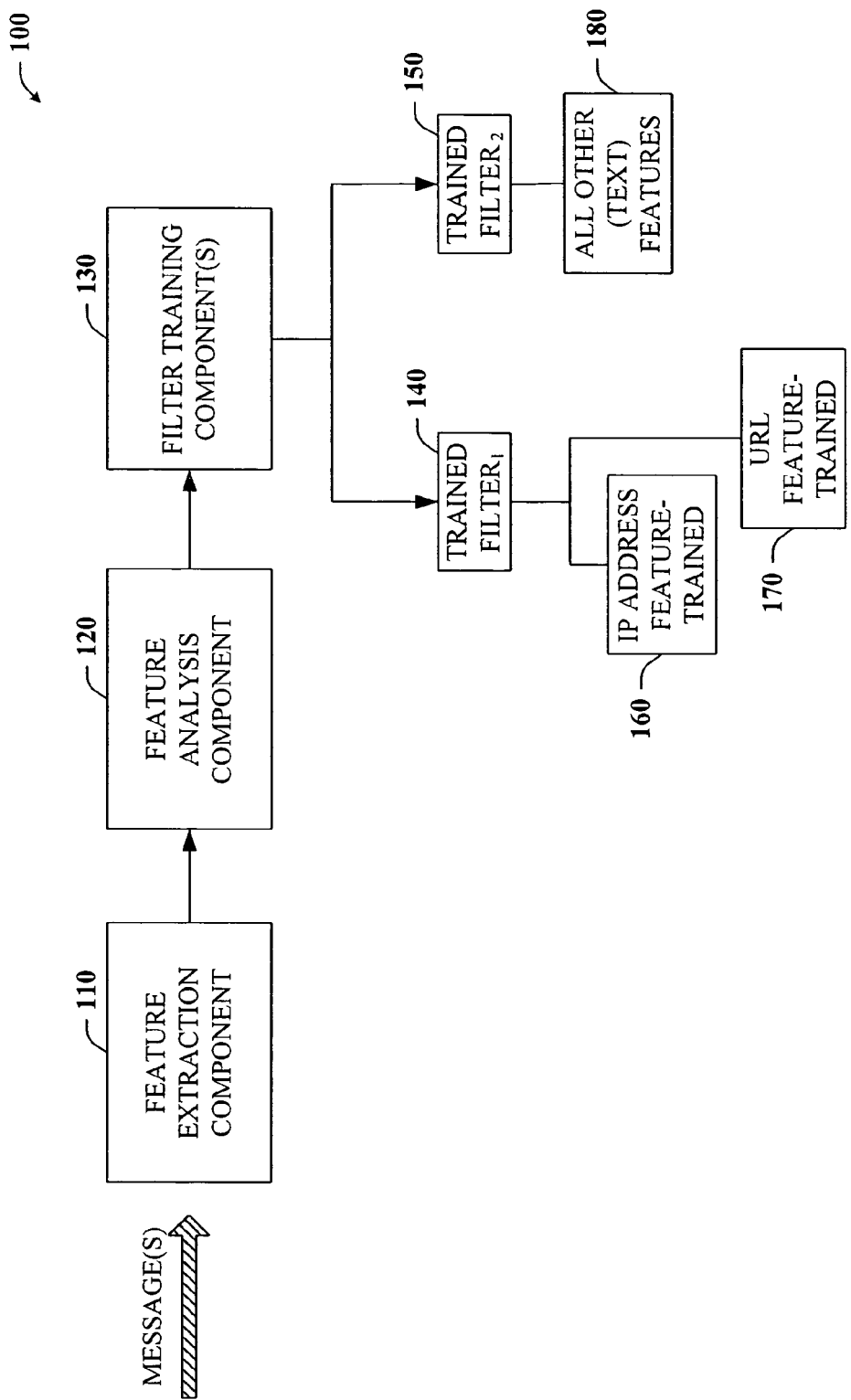
FIG. 1 is a high-level block diagram of a spam prevention system that can select at least one of at least two filters which are independently trained using different features to detect spam in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with generating training data for machine learned spam filtering. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is to be appreciated that although the term message is employed extensively throughout the specification, such term is not limited to electronic mail per se, but can be suitably adapted to include electronic messaging of any form that can be distributed over any suitable communication architecture. For example, conferencing applications that facilitate a conference or conversation between two or more people (e.g., interactive chat programs, and instant messaging programs) can also utilize the filtering benefits disclosed herein, since unwanted text can be electronically interspersed into normal chat messages as users exchange messages and/or inserted as a lead-off message, a closing message, or all of the above. In this particular application, a filter can be trained to automatically filter particular message content (text and images) in order to capture and tag as junk the undesirable content (e.g., commercials, promotions, or advertisements).

In the subject invention, the term "recipient" refers to an addressee of an incoming message. The term "user" refers to a recipient who makes use of messaging programs as well as filtering systems to detect and prevent spam and/or who has chosen, either passively or actively, or has been indirectly selected to participate in the feedback loop systems and processes as described herein.

One of the primary tasks of filtering systems can be to improve catch rates and to increase gains in spam detection. According to an aspect of the present invention, changing the smoothing of particular message features can facilitate increasing gains in spam detection. Smoothing can refer to an amount of trust for a particular feature. In general, smoothing or regularization techniques try to keep weights of features small. Since the weights of features of a message, for example, are added together to compute a score, a small weight means it contributes very little to the final score.

For instance, a random odd word in a message may just be there by chance. Therefore, it does not mean that the word can be trusted to indicate or identify either good or spam messages just because it has been seen in a few spam messages or a few good messages. However, the IP address indicates where the message comes from and can be difficult to forge. Furthermore, most IP addresses are pure: pure good or pure spam. Thus, if the same IP address is seen a few times, one can be pretty certain that it can identify either good or bad messages, as the case may be. By changing the smoothing such that less emphasis is put on making the weight of an IP address small or that more emphasis is put on making the weight of words small, the filter can rely more on the IP address. Because machine learning systems can see IP addresses fewer times than words to understand that it indicates good messages or spam, the IP addresses can be given a higher weight and thus more value can be added to the overall determination of whether a message is spam. As shown by experimentation of this, substantial increases in gains were observed.

Moreover, origination features like IP addresses and destination features like URLs are both very powerful parts of a message because they cannot be easily faked by spammers. As a result, they can be very powerful features for a spam filter and in particular, a machine learning based spam filter. Unfortunately, a generalization problem can exist. In particular, the IP address and/or URL features can change from day to day; thus filters trained to emphasize IP addresses over words can be ineffective and useless.

For instance, a spammer who sells mortgage refinancing can change his IP address from week to week. Some messages about mortgage refinancing are legitimate, although the vast majority is spam. If a filter has been trained to learn key words such as "mortgage" "refinance" "no" "obligation" and "free" as well as IP addresses, then it can determine to ignore all of those key words common to the mortgage-type messages and only look at the IP addresses because that may be the only feature different among the messages. This means that the filter may not factor the presence of the above key words in to its decision as to whether the message is most likely to be spam. When the spammer changes his IP address and sends the mortgage message again, the filter may not generalize to the new message because it does not recognize the new IP address. In the meantime, it can take a few weeks to update the filter and this delay can lead to the delivery of undesirable amounts of spam.

FIGS. 1-4 which follow below address the generalization to new messages in accordance with an aspect of the present invention. In FIG. 1, there is illustrated a high-level block diagram of a system 100 that facilitates spam prevention in part by training at least two different filters independently of each other using different feature types for each filter. The system 100 includes a feature extraction component 110 that can extract one or more features including origination or destination features as well as text or word related features from an incoming message(s).

The extracted data can be analyzed or organized by a feature analysis component 120 into two or more sets or subsets of training data for use with a respective training component 130. For instance, the extracted data can include IP addresses, the top 24 bits of IP addresses, the top 16 bits of IP addresses, URLs as well as domain names (fully qualified domain names and the sub-domains thereof), header line information, words, phrases, and/or character strings. Thus, the set of training data can comprise a first subset comprising IP address data, a second subset comprising the top 24 bits of IP addresses, a third subset comprising the top 16 bits of IP addresses, a fourth subset comprising URL data, and/or a fifth subset comprising substantially all other relevant text-related data.

The filter training component 130 can include a plurality of subcomponents that can individually train a first filter 140 on a particular subset of training data which is separate and apart from the training of a second filter 150 using a different subset of training data. For example, the first filter 140 can be trained on the IP address data (160) (or URL data 170). Meanwhile, the second filter 150 can be trained on the text-related features. As a result, the two filters are trained independently of the other such that the training of the one filter does not unduly influence the training of the other. Thus, when spammers change their IP addresses every few weeks, the IP address is not blindly relied upon to detect for spam. Instead the text-feature trained filter (150) can be employed to catch it.

Moreover, multiple filters can be trained, whereby each filter is trained on a different feature type to facilitate generalizing to new variations of features in spam messages. For example, when a full 32 bits of an IP address are not discernible, filters can be trained on less than 32 bits of the IP addresses. One filter can be trained on the top 24 bits of IP addresses, another filter can be trained on the top 16 bits of IP addresses, still another filter can be trained on URL data, etc. The same can be done with respect to domain names (sub-domains of fully qualified domain names). As a result, the most specific filter or model can be used based on the most amount of information available in an incoming message. For instance, if there is insufficient data on a particular IP address extracted from the message, but the top 16 bits of that IP address has been observed in previous messages, the filter trained on the top 16 bits can be employed since this is the most specific filter available based on the available data.

It should be appreciated that such specific filters can include or exclude other features and in particular, text-based features. For example, the filter trained on the top 16 bits of an IP address can also be trained on text-based features such as keywords, phrases, and the like. Conversely, the 16-bit filter can forgo training on text-based features. In such a case, an additional filter trained on the text-based features may be employed to filter the incoming messages.

In an alternative scheme, two or more different machine learning filters can be trained and employed concurrently or consecutively to more accurately detect spam—for example, one using at least one of the IP address features and the URLs, and the other using other relevant features. If these are probabilistic models, this is equivalent to assuming independence between the features in one model and the features in the other model. This can be somewhat unintuitive—one would expect the source of spam to be highly correlated with its content, so an explicit assumption of independence is surprising. Some model types (Naïve Bayes) assume independence between all features, and adding IP addresses and URLs as independent features to such a model is natural. Naïve Bayes models typically assume independence not because such independence is true, nor because it improves the model, but primarily because when all features are assumed independent, modeling becomes very simple. However, Naïve Bayes models typically have mediocre performance for spam filtering when compared to other model types (e.g., support vector machines (SVMs), perceptrons, maximum entropy (a.k.a. logistic regression), neural networks) that explicitly model dependence.

One of these more powerful model types can be used for modeling non-IP, non-domain features. When the base model type used for other features is powerful enough to model dependencies, it is very surprising to explicitly model either the URLs or the IP addresses as independent of the other features. The two or more models so trained can then be combined in multiple ways. If both models return scores of some sort (e.g., probabilities), the scores can be added together or multiplied together. Alternatively, an additional model such as a weighted linear combination, for example, can be trained to combine the scores.

Figure 2:
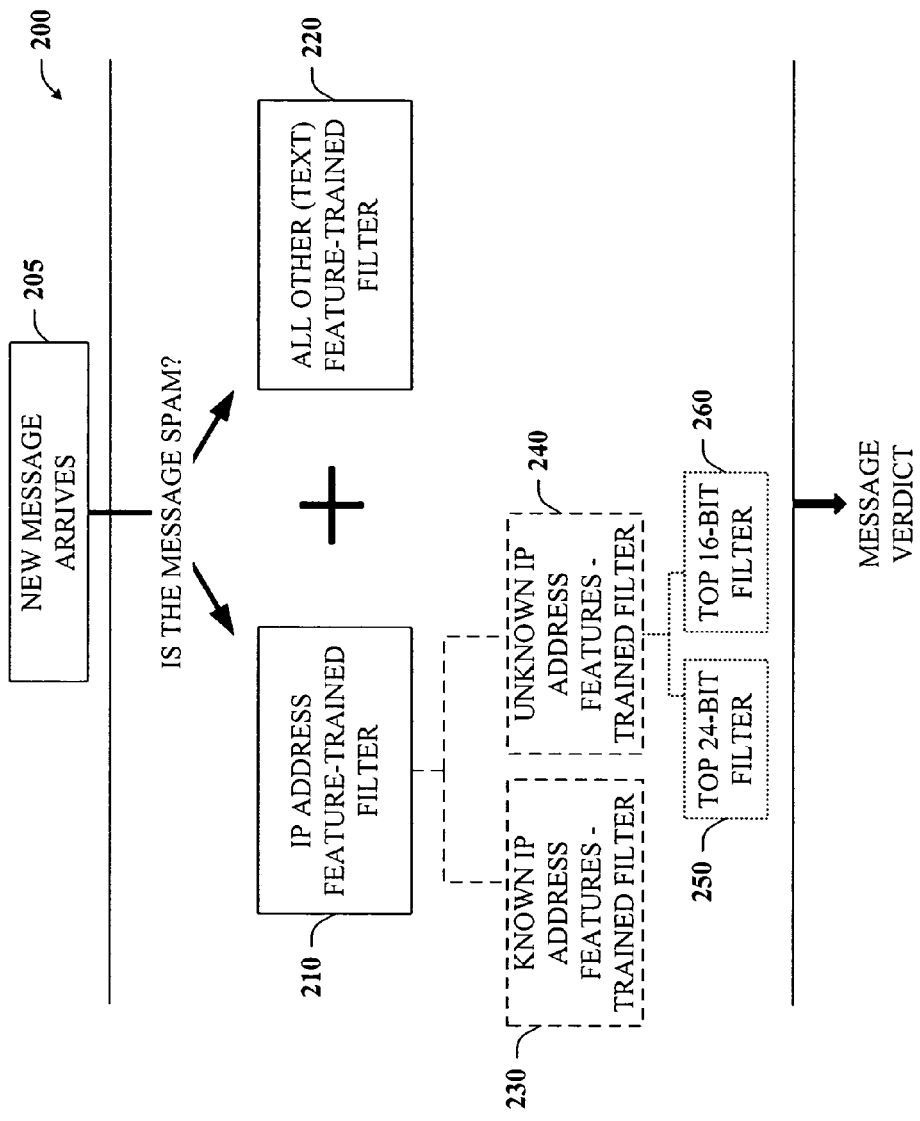
FIG. 2 is a block diagram of a filtering system that provides employment of at least a combination of two different filters that can be utilized together to detect spam in accordance with an aspect of the present invention.

Referring now to FIG. 2, there is illustrated a schematic diagram of an exemplary path 200 that a message 205 can take upon its arrival according to an aspect of the present invention. In particular, FIG. 2 demonstrates the utilization of two independently trained filters 210 and 220 when detecting for spam. Upon its arrival, the message 205 can be subjected to an examination by one or more feature-specific filters to determine whether the message is spam or legitimate. For instance, in the prior example where the spammer changed his IP address, the next time the message is received, it can be from a different or unknown IP address. To combat such an occurrence, two filters can be trained: one for the case where the IP address is known 230 and one for the case where the IP address is unknown 240. In addition, a filter trained only on other relevant features (e.g., text-based features) can also be trained (220).

In this instance, the text trained filter 220 can be applied to the message together with the unknown IP address filter 240 in order to determine whether the message is spam since the IP address extracted from the message is unknown. The unknown IP address filter can be trained by using other messages having unknown IP addresses which were received during a particular time frame. For example, messages also having unknown IP addresses that were received at about the same time as the current message can be used.

Unknown IP addresses can be viewed at several levels. For example, an unknown IP address can be one that has never been seen in its exact form; however, the top 16 or 24 bits of the IP address may have been observed before. Thus, a filter trained only on the top 24 bits can be employed. If only the top 16 bits of the IP address in the message have been seen before, then the 16-bit filter can be used—with or without the text-related filter. However, if the top 16 bits have never been seen before, then the text-related filter can be used alone. Thus, the filtering system can be optimized to generalize to employ the most specific filter or model for which there is sufficient data.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 3:
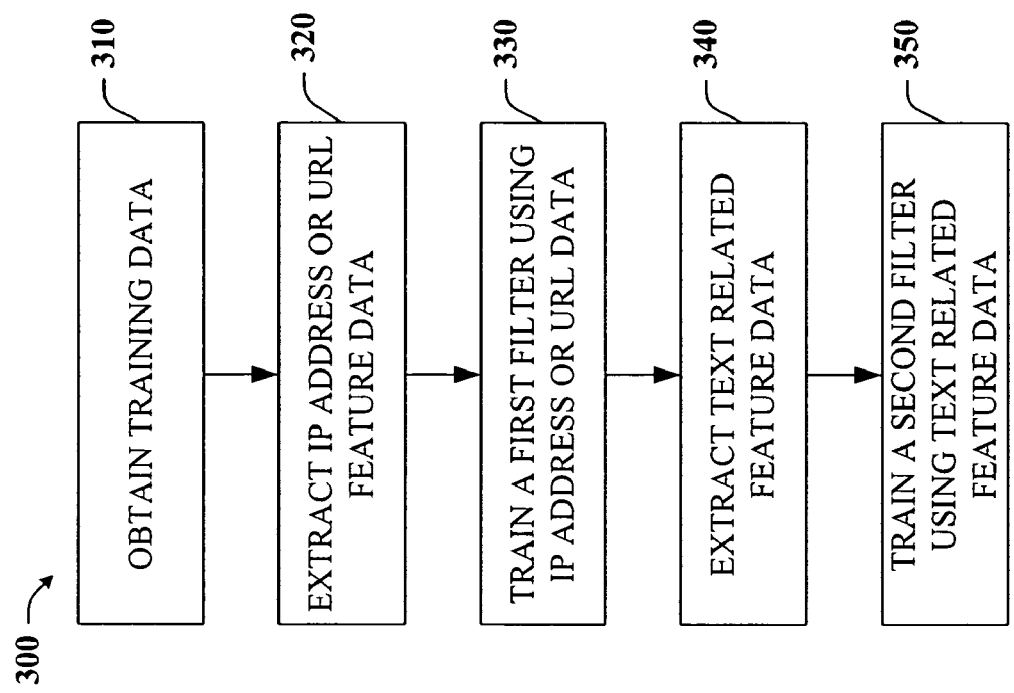
FIG. 3 is a schematic flow diagram of an exemplary method for training at least two separate machine learning filters that are independent of the other in accordance with an aspect of the present invention.

Referring now to FIG. 3, there is illustrated a flow diagram of an exemplary method 300 that facilitates building feature-specific filters separately from one another for employment in a spam prevention system. In particular, the method 300 involves obtaining training data at 310. The training data can comprise any number of messages that may be known to be either spam or good messages. At 320, one or more origination or destination features can be extracted from the message(s). Such features include IP address data (origination) and URL data (destination). At 330, a first filter can be trained using only the IP address or URL data. Meanwhile at 340, other relevant features such as text-related features can be extracted from the message(s) and then used to train a second filter at 350. It should be appreciated that the text-related features can also be extracted at about the same time as the origination and destination features at 320.

As can be seen in the figure, the second filter trained only on non-origination and non-destination features is trained separately and independently from the origination or destination-based filter. This mitigates undue influence from either feature over the other when examining messages for spam-like qualities and characteristics, which can be particularly pertinent when spam messages have changed slightly from previous known versions.

Though not depicted in the figure, extracting and filtering URL data presents additional challenges since a message can have multiple URLs included therein. Some URLs may be known and some may be unknown. In view of this, one filter for the known URLs can be employed and a different filter can be employed when at least one URL is unknown in the message.

Moreover, the present invention assumes independence between an IP address (or URL) and other features such as text features. However, the invention can assume dependence between text features. For example, the system or method as described in FIGS. 1-3, supra, can know that "click" and "here" go together. That is, independence is not assumed between "click" and "here" and thus, these dependencies can be modeled accordingly. On the contrary, independence is assumed between the IP address the "click here" comes from and the actual text. This runs directly contrary to Naives Bayes models that typically assume independence between all features. As demonstrated, the present invention assumes independencies between some features and dependencies between other features.

Figure 4:
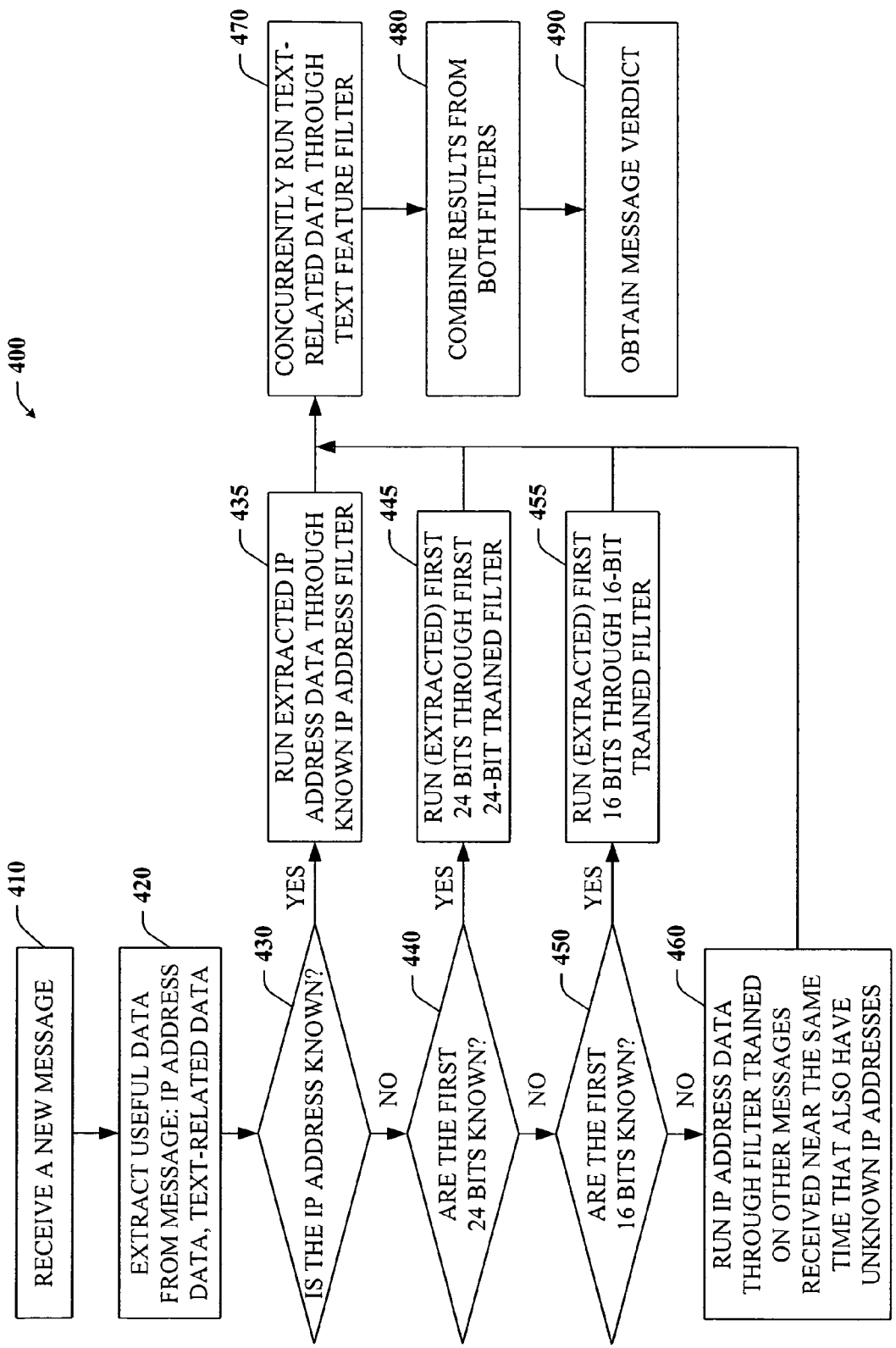
FIG. 4 is a schematic flow diagram of an exemplary method for determining which feature trained-filter or which model of filter to employ determines whether a message is spam in accordance with an aspect of the present invention.

Referring now to FIG. 4, there is illustrated a flow diagram of an exemplary logic process 400 that can be employed when determining whether incoming messages are spam. The process 400 involves receiving a new message(s) at 410 and then extracting useful data from the message at 420. Such useful data can include IP address data and text-related data. Following therefrom, it can be determined at 430 whether the IP address is known—that is, has it been seen before in previous messages such that a particular filter would recognize it. If the IP address is known, then the IP address data can be run through a known IP address filter at 435.

Conversely, if the IP address is unknown at 430, then the method can determine if the top 24 bits of the IP address data are known at 440. This can be an important determination since it is possible that the IP address extracted from the message is incomplete. Alternatively, if an exact match to the IP address is unknown, but other messages having the same top 24 bits have been observed in previous messages, a filter trained on the top 24 bits of that IP address can be used to determine if the message is spam at 445. However, the top 24 bits may be unknown as well. In this case, it can be determined whether the top 16 bits of that IP address are known at 450. If yes, then the top 16 bits of the extracted IP address data can be run through a 16-bit trained filter at 455. If no, then the available IP address data can be run through a filter trained up on other messages received near the same time as the current message that also have unknown IP addresses at 460.

Concurrently or following therefrom, extracted text-based features can be run through a text-based feature filter at 470. The results (scores) from the filtering runs can be collected and then combined at 480. There are different ways to combine filter results from the at least two filter models. In one approach, the scores can be multiplied. Another approach calls for adding the scores together while a third approach assesses both scores based on the particular filter's effectiveness in detecting spam, for example. In other words, if an IP address model is about 90% effective and a text features model is about 10% effective, the overall effectiveness of the filtering scheme can be concluded to be about 80% effective because the IP address model can be trusted more, and hence given more value or weight in this determination. An additional filter can be trained to combine scores in such a manner. Finally, a message verdict can be obtained at 490.

Messages can include many features of a particular type, and in many cases, it is not clear which feature is the relevant one because spammers may try to confuse spam filters, thus rendering the features ambiguous. In particular, there are two cases. First, with URLs, a spammer may add as many URLs as he wants to the message. Second, there is the IP address. In many cases, such as on a server, the system can tell which is the last IP address external to the system, but this is relatively uncommon on a client. In particular, messages are typically sent from server to server to server. In some cases, especially email server software, the last IP address external to the recipient's organization can be clearly identified. Unfortunately, this is the only (external) IP address that the recipient can trust—since there is no reliable way to know which other IP addresses were actually used. On client software, the client will receive a list of IP addresses (in reverse order from which they were received.) He does not know which ones are external to his organization, and which ones are internal. As on the server, of the external IP addresses, he can only trust the last external address (highest external server on the list)—except he does not know which IP address this is.

As previously mentioned, the ambiguity problem also exists for URLs. Typically, a spammer will only send users to one URL, but he can include links to other domains, including known good domains. The links to the known good domains will typically be in places where users are unable to click on them, but where it is difficult for an automatic spam filter to tell the difference between the true link and the false ones.

There are a couple of common heuristics for finding the last external IP address. Unfortunately, none of them consistently work with reasonable accuracy. In one heuristic, the MX record for the recipient's organization is looked up. For example, if his email address is known to be name@yourdomain.com, the MX record, which contains the list of IP addresses for yourdomain's gateway servers for yourdomain.com can be looked up. The client then looks down through the received-from list until one of these addresses is found. Unfortunately, this does not always work because the inwards and outwards IP addresses may be different for the gateway box.

A similar heuristic uses internal IP addresses. Some IP address ranges are internal-only (those that start with 192, for instance). By going down through the list until one finds an IP address that is not definitely internal, perhaps one can find the first external one. Similarly, one can perform reverse IP lookups on each IP address in the list, and see if it maps to the same domain as the recipient. Eventually, one finds an IP address that fails both of these heuristics, and assumes it is the last external one. Unfortunately, these heuristics don't necessarily work either. For instance, some companies' servers use statically defined addresses, not the ones in the internal only ranges. Furthermore, the reverse-IP mapping is not always set up correctly. Finally, some domains owned by a common owner may use the same servers for both domains. Imagine that Zoomail and ZNN are domains which use the same serves for both domains and Zoobox is used to access messages on Zoomail or ZNN on a client. If Zoomail uses .zoomail.com for all its servers—then a Zoobox client for a ZNN user would find such a server on its list and assume it was external—so even requiring all admins to set up their internal server reverse IP addresses correctly would not work.

One algorithmic methodology that has been shown to work has been described in the related co-pending application (Ser. No. 10/454,168). As stated therein, one way for spam filtering software to find this sender's IP address is to know the mail server configurations at an organization. In general, if one knows which machines pass to which other machines in which situations, one can determine the sender's IP address. However, especially for spam filtering software installed on email clients, it may not be convenient to describe the server configuration. An alternate approach involves utilizing MX records to determine the true source of a message. MX records list, for each domain, the FQDNs (fully qualified domain names—the names of the machines) of recipients of email for that domain. These FQDNs can be mapped to their IP addresses, and we can trace back through the received from list until we find an IP address corresponding to an FQDN corresponding to an entry in the domain's MX record. The IP addresses that this machine received from is the sender's IP address. Imagine that 1.2.3.101 is the only MX record for x.com. Then by finding the line that received from 1.2.3.101, we know the next line corresponds to x.com's incoming mail server, and thus that the IP address in that line corresponds to the IP address that sent to x.com.

| Line | comment |
|---|---|
| Received: from a.x.com ([1.2.3.100]) by b.x.com Tue, 22 Apr. 2003 13:11:48 -0700 | Internal to x.com |
| Received: from mailserver.x.com ([1.2.3.101]) by b.x.com Tue, 22 Apr. 2003 12:11:48 -0700 | 1.2.3.101 is an MX record for x.com so we know next line is first internal to x.com |
| Received: from outside.com ([4.5.6.7]) by mailserver.x.com Tue, 22 Apr. 2003 11:11:48 -0700 | This is where x.com received the message; this is the last trusted line. Use 4.5.6.7 as sender's IP address |
| Received: from trustedsender.com ([8.9.10.11]) by outside.com Tue, 22 Apr. 2003 10:11:48 -0700 | This line may be fake, constructed by server at 4.5.6.7 |

Note that there is no currently accepted standard for listing outgoing mail servers, and note that this heuristic can fail if, for instance, IP addresses internal to an organization are different than those external to an organization, or if an organization sends mail from one machine listed in an MX record indirectly to another machine listed in an MX record. Note also that in the special case where the sender's IP as found above is found to be internal to the organization, as could happen if one machine in the MX record sent to another in the MX record, the process is continued as above. In addition, certain IP addresses can be detected as internal (because they are of the form 10.x.y.z or 172.16.y.z through 172.31.y.z or 192.168.0.z through 192.168.255.z, a form used only for internal IP addresses); any address internal to an organization can be trusted. Finally, if a received from line is of the form "Received from a.x.com [1.2.3.100]" and an IP address lookup of a.x.com yields 1.2.3.100 or a reverse IP address lookup of 1.2.3.100 yields a.x.com and if x.com is the organization, then the next line can also be trusted.

Using these observations, it is often possible to find the sender's IP address. The exemplary pseudocode is as follows:

```
bool fFoundHostInMX;
if (external IP address of MX records matches internal IP address
of MX records)
{
    fFoundHostInMX = FALSE; # it's worth looking for
} else {
    # This is also the case to use when we don't know if the
    internal and external addresses match.
    # If we use this case, we often return "don't know" but
    that's better than being wrong
    fFoundHostInMX = TRUE; # it's not worth looking for, pretend
    we already found it
}
for each received from line of the form Received from a.b.c
[i.j.k.l] {
    if i.j.k.l in MX records of receiver domain
    {
        fFoundHostInMX = TRUE;
        continue;
    }
    if not fFoundHostInMX
    {
        # Has not yet gone through an MX record, must be internal
        continue;
    }
    if i.j.k.l is of form
        10.x.y.z or
        172.16.y.z to 172.31.y.z or
        192.168.0.z to 192.168.255.z
    {
        # Must be internal
        continue;
    }
    if DNS lookup of a.b.c yields i.j.k.l and b.c is receiver
    domain
    {
        # Must be internal
        continue;
    }
    Output sender's alleged FQDN a.b.c and sender's actual IP
    address i.j.k.k
}
If we reach here, then Error: unable to identify sender's alleged
FQDN and sender's actual IP address
```

Unfortunately, much of the time, the previous algorithmic methodology simply concludes that it is unable to find the sender's actual IP address with confidence.

Turning now to FIG. 5, there is a flow diagram of one exemplary technique 500 that may work. The technique 500 involves a machine learning system attempting to learn which IP addresses are internal and which are external. For instance, on an email client, we can keep track of which messages a user marks as spam, and which messages a user marks as good at 510. When the user identifies a message as spam, it can be determined that at least one of the two or more IP addresses is bad at 520. At 530, we can then try to find an assignment of IP addresses (or hostnames from reverse IP lookups) to internal and external that maximizes the probability of the training data, or that maximizes accuracy on the training data. Following, at 540, the weight of the bad IP address can be adjusted for being an external IP address.

Referring now to FIG. 6, there is illustrated a flow diagram 600 of another option that can try to detect, using for instance a text-only model, good messages and spam at 610, and to use this as an input to the learning of which IP addresses are internal or external at 620. For instance, good messages do not include forgeries, and so may make it clear, e.g., from domain names, which are the external IP addresses, thus making it clear which are the recipient's edge servers.

Yet another option is to assume that the worst scoring IP address or worst scoring URL in a message is the most accurate predictor. That is, let SCORE(input) represent the score of an INPUT (e.g., an IP address or URL). High values are considered bad (more spammy) in the present system. So, then the overall score returned for the IP part of a message in our system with n incoming IP addresses would be MAX (SCORE($IP_1$), SCORE($IP_2$), . . . , SCORE($IP_n$)). The score function might be a constant for each IP address. In other words, there is a list of IP addresses and their corresponding scores, or it might be a function in its own right, e.g., we use information such as the IP address, the top 24 bits of the IP address, reverse DNS lookups on the IP address, etc., as features to a scoring function. The same can be done for URLs.

It is typically hard to do machine learning for functions that are not smoothly differentiable, such as the MAX function. However, the following describes a technique for doing such learning. This algorithm can be written as if it is for messages and IP addresses and features of IP addresses, but it will be evident that the same algorithm can be used for inputs other than email messages, e.g., any "instance" for a machine learning system, and it will be evident that the properties of interest are not limited to IP addresses, but could be URLs, words, or any properties of the training instance that may occur more than one time within a training instance.

The algorithm that is proposed is as follows:

Let MAXSCORE(mk) be the overall score of message k.

Let $IPk_1$ $IPk_2$, ... $IPk_{k1}$ represent the IP addresses in message k.

Then MAXSCORE(mk)=MAX(SCORE($IPk_1$), SCORE ($IPk_2$), ..., SCORE($IPk_{k1}$)).

Assume there is an objective function that we are trying to maximize (e.g., maximize accuracy on the training data, maximize the log probability of the training data, maximize a combination of accuracy and negative sum of square of weights, etc.). Call this function OBJECTIVE(m1 ... mk, w1 ... wn): it is a function of the weights and the training messages.

Assume that OBJECTIVE is a differentiable function of the weights.

Assume that the SCORE function is the sum of the weights. The exemplary pseudocode is as follows:

```
for each iteration until enough iterations or convergence {
    for each feature f_i {
        let m1...mp be the training instances (e.g., messages)
        that have feature f_i in one of their IP addresses {
            let MAXSCORE-fi(mq, w) be the value that
            MAXSCORE(mq) would have if feature i had weight
            w, and all other weights were unchanged.
            for each message mq, find the weight vq for f_i
            such that MAXSCORE-f_i (mq, w) shifts from being
            independent of w to being dependent on w (if all
            IP addresses in mq have feature f_i, then vq = -
            infinity.) In particular, vq = limit as w
            approaches infinity of MAXSCORE-f_i(mq, -
            infinity) - MAXSCORE-f_i(mq,w) + w.
            sort all messages mq by the weight vq in
            increasing order. (Assume that mq and vq refer
            to the sorted order.)
            now, for the current feature f_i, for values of w
            between vq and vq+1, OBJECTIVE(m1 ... mn, w1 ... wq-
            1,w,wq+1, ... wn) is differentiable; use standard
            means to solve for the best value. Note that
            depending on the form of OBJECTIVE, even more
            efficient techniques may be possible. For
            instance, if OBJECTIVE is simply the function
            that gives one point for each correctly
            classified message, then a binary search across
            all values can be used, and only values w = vq
            for some q will change the objective function
        }
    }
}
```

Figure 7:
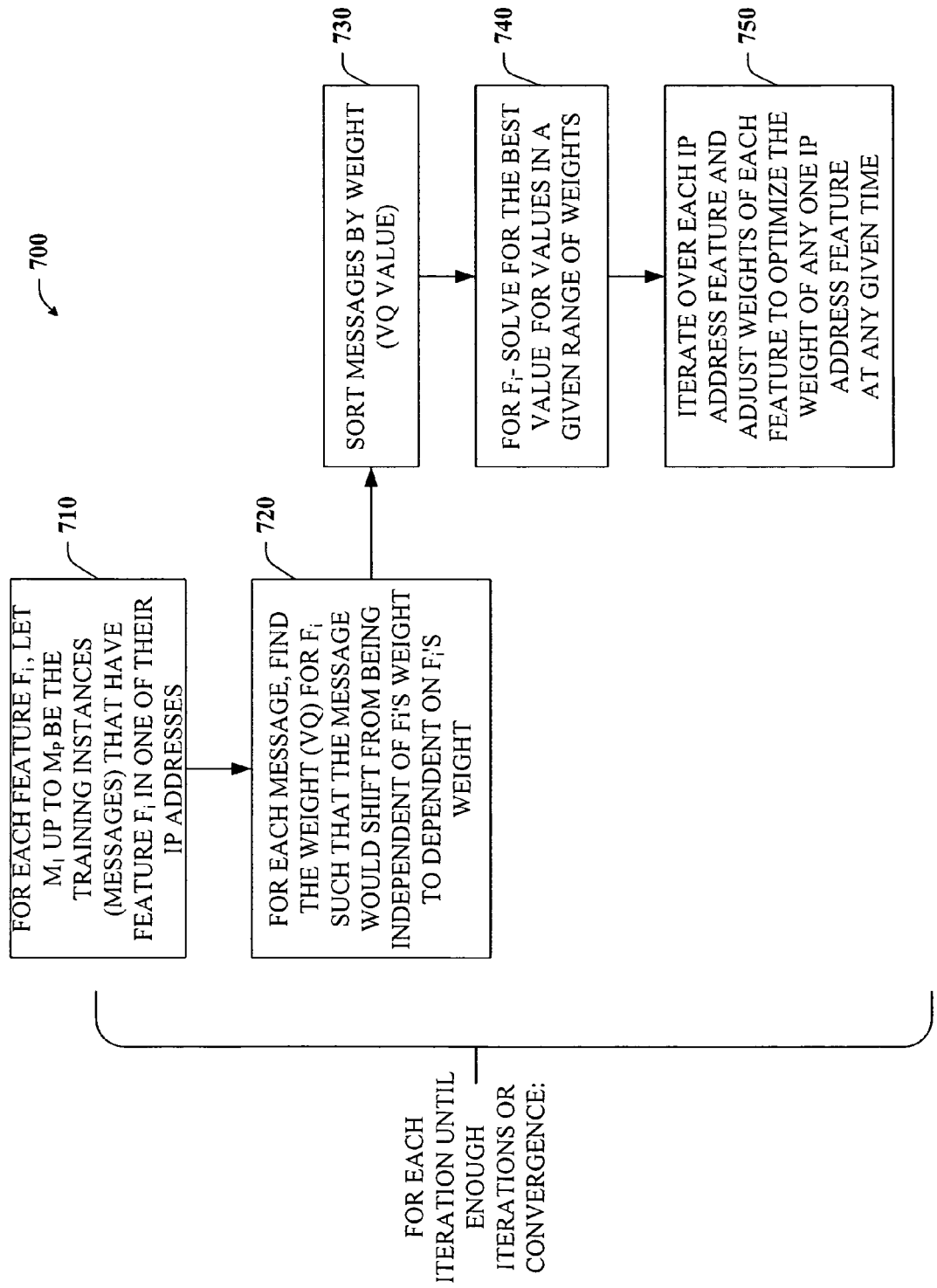
FIG. 7 is a flow diagram of an exemplary method that facilitates performing machine learning for functions that are not smoothly differentiable with respect to messages and IP addresses and features of IP addresses in accordance with an aspect of the present invention.

FIG. 7 illustrates the above algorithmic methodology 700 as a flow diagram. In particular, for each feature $f_i$, let m1 up to mp be the training instances or messages that have feature $f_i$ in one of their IP addresses at 710. At 720, find the weight (vq) for $f_i$ where the message would shift from being independent of $f_i$'s weight to dependent on $f_i$'s weight—for each message. At 730, sort the messages by weight (vq). At 740, for $f_i$, solve for the best value for values in a given range of weights. At 750, iterate over each IP address feature and learn how to adjust the weights of each feature to optimize the weight of any one IP address feature at any given time.

Thus, the method 700 is concerned with optimizing the weights associated with one feature at any given time. Messages that have that feature can be found; thus any other messages are not a concern. Essentially, the method wants to find the best weight for a feature. If it is a really high weight, it will be higher than everything else so as this weight changes, every other weight can change as well. However, if it is a really low weight, it will be lower than everything else and changing it will not change any other weight. So for each message, finding the value of that weight (vq) which the message would be dependent on is desired. Once the vq values for each message are determined, the messages can be sorted accordingly. Instead of checking different ranges and looking within each range to find the best value of vq, the change points can be looked at since these can be true points of interest.

Yet another technique for learning such functions is to notice that $MAX(a_1, a_2, \ldots, a_n)$ is approximately equal to $SUM(a_1^x, a_2^x, \ldots, a_n^x)^{(1/x)}$ where the approximation becomes more accurate the larger the value of x. One can use this function instead of the MAX function to get a function that is differentiable, and then one can use standard gradient descent style optimization techniques. Gradients may become steep for large values of x, so one may wish to initially use a small value of x, e.g., 1 or 2, perform gradient descent, and then increase x and repeat.

When an IP address or URL is present and known, it can typically be one of the most valuable features in the message. Machine learning systems may not naturally assign more weight to these known IP addresses and URLs than to other features, such as known words. The system must be told in some way that these weights are more useful than other weights. This can be referred to as a value problem.

The value problem can be addressed through smoothing, which is also known as regularization. Typical machine learning systems smooth their parameters in some way. To give five examples, neural networks often use weight decay; maximum entropy models (also known as logistic regression) can use a Gaussian or Exponential prior; Support Vector Machines (SVMs) typically have a term minimizing the sum square of the weights, or the sum of the absolute values of the weights; and decision trees are often smoothed with a Dirichlet prior.

For all of these techniques, it is possible to modify the regularization so that the IP addresses or URLs are counted as more valuable. In addition, the smoothing can vary for sub-portions of features such as IP addresses or URLs. For example, different smoothing values can be employed for all 32-bits, a top 24-bits, and a top 16-bits of an IP address.

Figure 8:
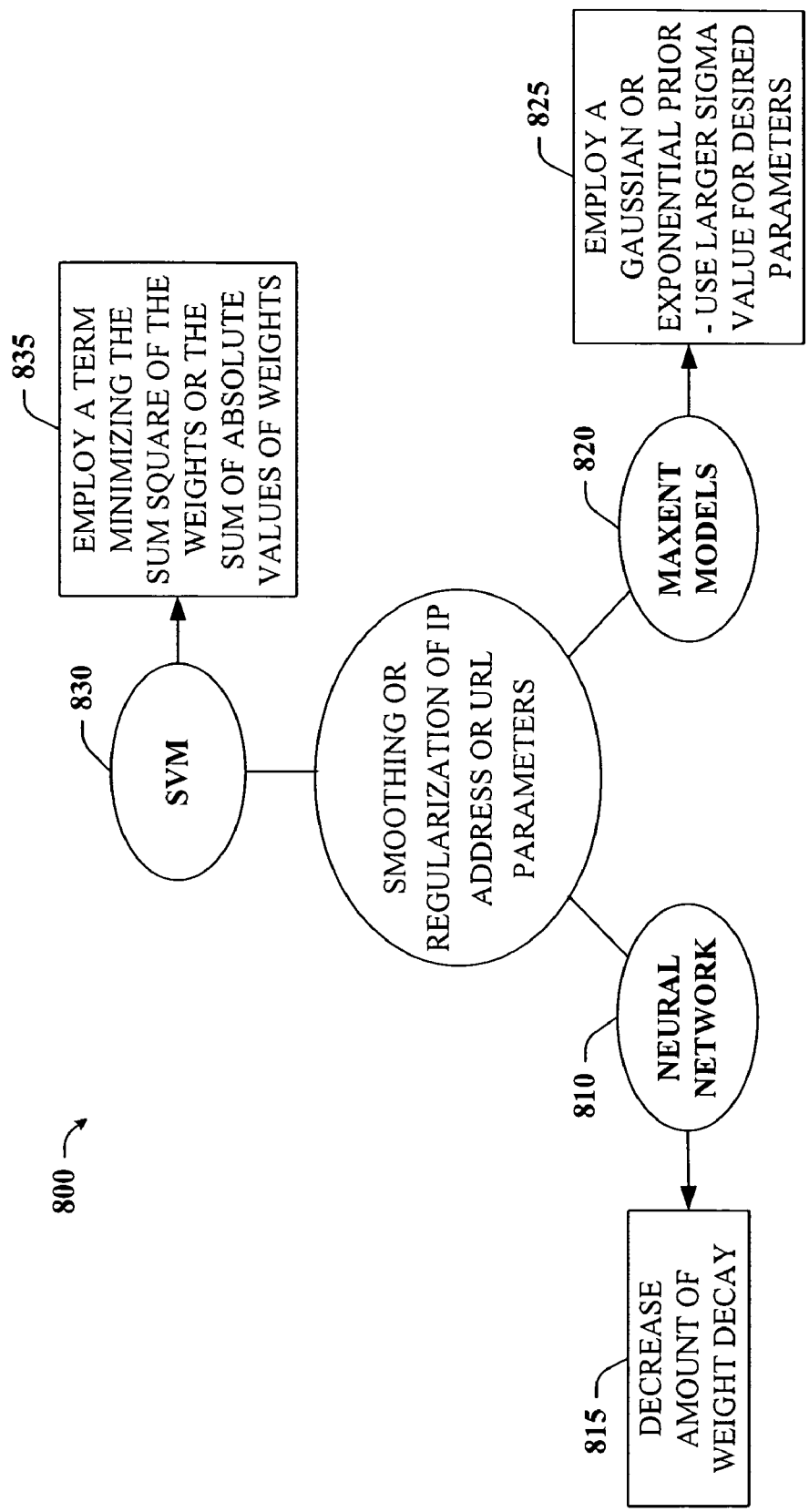
FIG. 8 is a schematic diagram of machine learning systems and their smoothing can be altered so that IP addresses and URLs are given more value and counted as more valuable.

FIG. 8 provides a schematic diagram of the various smoothing techniques as modified by three machine learning systems to altering the associated smoothing effects. For instance, with a neural network 810, one can decrease the amount of weight decay on weights from IP addresses or URLs at 815. For Support Vector Machines 830, the formula usually optimized is (835):

$$\sum w_i^2 + c \sum \text{penalty}(\text{score}(\text{message}(j)), \text{truth}(j))$$

where penalty is a penalty function.

This can be rewritten as:

$$\frac{1}{c} \sum w_i^2 + \sum \text{penalty}(\text{score}(\text{message}(j)), \text{truth}(j)).$$

If we want, we can use different weights for different features. Instead of having one value of c, we can have one value of $c_i$ for each weight $w_i$:

$$\sum \frac{1}{c_i} w_i^2 + \sum \text{penalty}(\text{score}(\text{message}(j)), \text{truth}(j)).$$

With maximum entropy models 820, one can use a larger standard deviation for the Gaussian prior at 825. For maximum entropy models, the formula usually optimized is $$\left(\prod_i P(y_i \mid x_i; \Lambda)\right) \times \left(\prod_j P(\lambda_j)\right).$$

That is, the first term is the probability of the training data, given the parameters of the model ($\Lambda$). The second term is the probabilities of each parameter. The probability of a parameter is defined by, for instance, a Gaussian distribution, typically with mean 0, and standard deviation $\sigma_i$. We can make the value of $\sigma_i$ be different for different parameter types, including making it larger for IP address or URL features.

Typically, features are assigned values of 0 or 1. For instance, the presence of an IP feature such as 1.2.3.4 might result in the presence of a feature $f_{1000}$ that has value 1 when the IP address is present and 0 when it is not. It will be recognized by those skilled in the art of machine learning that using a larger value for $f_{1000}$, e.g. $f_{1000}=10$ when the IP address is present, 0 when it is not, will have a similar or identical effect in many model types, including SVMs and maximum entropy models, as changing the smoothing explicitly.

Note that in practice for IP addresses, features based not just on the IP address, but based also on the top 24 and top 16 bits, or other combinations of bits can be employed. Note that for URL features portions of the URL, such as the fully qualified domain name, and sub-domains of the fully qualified domain name can also be used. The systems and method described hereinabove can also be combined with quarantining techniques (e.g., suspending delivery of messages until more information can be collected about the messages) and with a feedback loop, whereby participating users provide feedback in the form of classifications of messages to facilitate updating and/or building filters.

Figure 9:
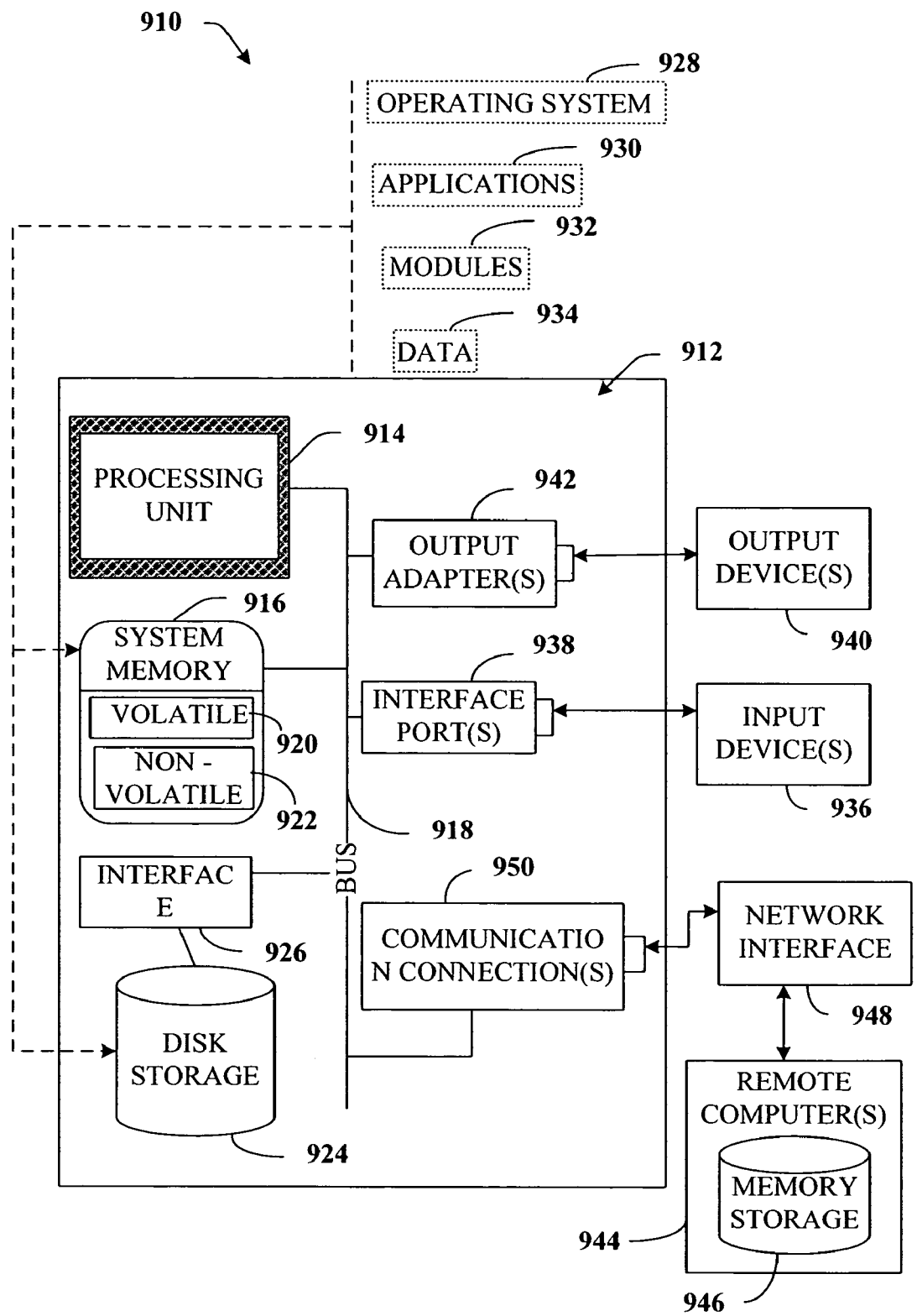
FIG. 9 is a schematic block diagram of an exemplary communication environment in accordance with the present invention.

In order to provide additional context for various aspects of the present invention, FIG. 9 and the following discussion are intended to provide a brief, general description of a suitable operating environment 910 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the invention includes a computer 912. The computer 912 includes a processing unit 914, a system memory 916, and a system bus 918. The system bus 918 couples the system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine-implemented system that facilitates spam detection comprising a processor executing:
   a feature extraction component that receives an item and extracts a set of features associated with an origination of a message or part thereof and/or information that enables an intended recipient to contact or respond to the message;
   a feature analysis component that analyzes a subset of the extracted features in connection with building and employing a plurality of feature-specific filters that are independently trained to mitigate undue influence of at least one feature type over another in the message, the subset of extracted features comprising of at least one of a Uniform Resource Locator (URL) and an Internet Protocol (IP) address, and the plurality of feature-specific filters comprising at least a first feature-specific filter; and
   a machine learning component that determines last IP address external to the recipient's system via a machine learning technique to facilitate spam detection, the machine learning component employs MX records to determine a true source of a message by way of tracing back through a received from list until an IP address is found that corresponds to a fully qualified domain which corresponds to an entry in the domain's MX record and determines whether the IP address is external or internal by verifying if the IP address is in a form characteristic to internal IP addresses and performing at least one of an IP address lookup and a reverse IP address lookup to ascertain whether the IP address correlates with a sender's domain name.

2. The system of claim 1, further comprising a plurality of training components that individually employ at least one of IP addresses or URLs and other features, respectively, in connection with building the plurality of feature-specific filters.

3. The system of claim 1, the first feature-specific filter is trained using IP addresses.

4. The system of claim 1, the first feature-specific filter is trained using URLs.

5. The system of claim 1, the plurality of feature specific filters comprising a second feature-specific filter that is trained using a subset of features extracted from the message other than a URL and an IP address.

6. The system of claim 1, further comprising a filter combining component that combines information collected from the first feature-specific filter and a second feature-specific filter.

7. The system of claim 6, the first feature-specific filter detects at least one of known IP addresses and at least one known URL in the message.

8. The system of claim 6, the second feature-specific filter detects non-IP address and non-URL data in the message.

9. The system of claim 6, the filter combining component combines the information by at least one of multiplying scores generated by the filters, adding scores generated by the filters, or training an additional filter to combine the scores.

10. The system of claim 1, the first feature-specific filter is trained independently of a second feature-specific filter to mitigate either filter influencing the other when filtering the message.

11. The system of claim 10, at least one of the feature-specific filters models dependencies.

12. The system of claim 1, the plurality of feature-specific filters is machine learning filters.

13. The system of claim 1, the machine learning component determines whether the IP address is external or internal comprises at least one of the following:
- collecting user feedback related to user classification of messages as spam or good;
- examining messages classified as good by a user to learn which servers are internal; and
- finding a worst-scoring IP address in a message.

14. A machine-implemented system that facilitates spam detection comprising a processor executing:
- a feature extraction component that receives an item and extracts a set of features associated with an origination of a message or part thereof and/or information that enables an intended recipient to contact or respond to the message;
- at least one filter that is used when one of an Internet Protocol (IP) address of the message or at least some part of at least one of Uniform Resource Locator (URL) in the message is unknown; and
- a machine learning component that determines last IP address external to the recipient's system via a machine learning technique to facilitate spam detection, the machine learning component employs MX records to determine a true source of a message by way of tracing back through a received from list until an IP address is found that corresponds to a fully Qualified domain which corresponds to an entry in the domain's MX record and determines whether the IP address is external or internal by verifying if the IP address is in a form characteristic to internal IP addresses and performing at least one of an IP address lookup and a reverse IP address lookup to ascertain whether the IP address correlates with a sender's domain name.

15. The system of claim 14, the at least one filter is trained using some number of bits less than 32 bits of an IP address.

16. The system of claim 14, the at least one filter is trained using all bits of an IP address.

17. The system of claim 14, further comprising a filter selection component that selects and employs at least one feature-specific filter out of a plurality of feature-specific filters for which there is sufficient data extracted from the message.

18. A machine-implemented system that facilitates spam detection comprising a processor executing:
- a feature extraction component that receives an item and extracts a set of features associated with an origination of a message or part thereof and/or information that enables an intended recipient to contact or respond to the message;
- at least one filter that is used when one of the Internet Protocol (IP) address of the message or at least some part of at least one of the Uniform Resource Locators (URLs) in the message is known; and
- a machine learning component that determines last IP address external to the recipient's system via a machine learning technique to facilitate spam detection, the machine learning component employs MX records to determine a true source of a message by way of tracing back through a received from list until an IP address is found that corresponds to a fully Qualified domain which corresponds to an entry in the domain's MX record and determines whether the IP address is external or internal by verifying if the IP address is in a form characteristic to internal IP addresses and performing at least one of an IP address lookup and a reverse IP address lookup to ascertain whether the IP address correlates with a sender's domain name.

19. The system of claim 18, the at least one filter is trained on one of known IP addresses or known URLs together with text-based features.

20. The system of claim 18, further comprising at least one other filter that is used to examine text-based features in the message.

21. A machine learning method implemented on a machine that facilitates spam detection by optimizing an objective function of the form
OBJECTIVE(MAXSCORE(m1), MAXSCORE(m2), ..., MAXSCORE(mk), w1 ... wn) where MAXSCORE(mk) =MAX(SCORE(IPk,1), SCORE(IPk,2), ..., SCORE(IPk,kI))
where mk =messages;
IPk,i represents the IP addresses of mk;
SCORE(IPk,i)=the sum of the weights of the IPk,i, and wherein the machine learning method optimizes the weights associated with one feature at any given time and maximizes accuracy on a training data to facilitate improved detection of spam, the machine learning method employs MX records to determine a true source of a message by way of tracing back through a received from list until an IP address is found that corresponds to a fully qualified domain which corresponds to an entry in the domain's MX record and determines whether the IP address is external or internal by verifying if the IP address is in a form characteristic to internal IP addresses and performing at least one of an IP address lookup and a reverse IP address lookup to ascertain whether the IP address correlates with a sender's domain name and further determines last IP address external to a recipient's system to facilitate spam detection.

22. The machine learning method of claim 21, the objective function depends in part on whether the messages are properly categorized as any one of spam or good.

23. The machine learning method of claim 21, further comprises learning the weights for each feature in turn.

24. The machine learning method of claim 23, learning the weight for a given feature comprises sorting training instances comprising a property, the property comprising a feature in order by the weight at which the score for that message varies with the weight for that feature.

25. The machine learning method of claim 24, the training instances comprise electronic messages.

26. The machine learning method of claim 21, the messages are training instances and the property and the properties comprise one or more IP addresses that the message originated from and any URLs in the message.

27. The machine learning method of claim 21, learning is performed using an approximation $MAX(a_1, a_2, \ldots, a_n)$ is approximately equal to $SUM(a_1^x, a_2^x, \ldots, a_n^x)^{(1/x)}$.

28. The machine learning method of claim 27, the objective function depends in part on whether the messages are properly categorized as spam or good.

29. A machine-implemented method that facilitates spam detection comprising:
- providing a plurality of training data;
- extracting a plurality of feature types from the training data, the feature types comprising at least one Internet Protocol (IP) address, at least one Uniform Resource Locator (URL) and text-based features;
- training a plurality of feature-specific filters for the respective feature in an independent manner so that a first feature does not unduly influence a message score over a second feature type when determining whether a message is spam;

employing MX records to determine a true source of a message by way of tracing back through a received from list until an IP address is found that corresponds to a fully qualified domain which corresponds to an entry in the domain's MX record;

verifying if the IP address is in a form characteristic to internal IP addresses;

performing at least one of an IP address lookup and a reverse IP address lookup to ascertain whether the IP address correlates with a sender's domain name; and determining last IP address external to the recipient's system to facilitate spam detection.

30. The method of claim 29, the plurality of training data comprises messages.

31. The method of claim 29, the plurality of feature-specific filters comprises at least two of the following:
 a known IP address filter;
 an unknown IP address filter;
 a known URL filter;
 an unknown URL filter; and
 a text-based filter.

32. The method of claim 31, the known IP address filter is trained using 32 bits of IP addresses.

33. The method of claim 31, the unknown IP address filter is trained using some number of bits of IP addresses less than 32 bits.

34. The method of claim 31, the unknown IP address filter is trained using other messages comprising unknown IP addresses.

35. The method of claim 31, the text-based filter is trained using words, phrases, character runs, character strings, and any other relevant non-IP address or non-URL data in the message.

36. The method of claim 31, employing at least one of the known IP address filter, the unknown IP address filter, the known URL filter, and the unknown URL filter together with the text-based filter to more accurately determine whether a new message is spam.

37. The method of claim 31, further comprising employing at least one of the feature-specific filters in connection with determining whether a new message is spam, such that the feature-specific filter is selected based in part on most relevant feature data observed in the new message.

38. The method of claim 31, the URL filter is trained on URL data comprising a fully qualified domain name and subdomains of the fully qualified domain name.

39. The method of claim 31 combined with a feedback loop mechanism whereby users provide their feedback regarding incoming messages by submitting message classifications to fine tune the one or more feature-specific filters.

40. The method of claim 29, further comprising combining message scores generated from at least two filters used to scan a new message to generate a total score that facilitates determining whether the message is spam.

41. The method of claim 40, combining message scores comprises at least one of the following:
 multiplying the scores;
 adding the scores; and
 training a new model to combine the scores.

42. The method of claim 29, further comprising quarantining messages that satisfy at least one criterion for a period of time until additional information about the message can be collected to update one or more feature-specific filters to facilitate determining whether the messages are spam.

43. A machine-implemented method that facilitates spam detection comprising:
 extracting data from a plurality of messages;
 training at least one machine learning filter using at least a subset of the data, the training comprising employing a first smoothing for at least one of Internet Protocol (IP) address or Uniform Resource Locator (URL) features and at least a second smoothing for other non-IP address or non-URL features;
 employing MX records to determine a true source of a message by way of tracing back through a received from list until an IP address is found that corresponds to a fully Qualified domain which corresponds to an entry in the domain's MX record;
 verifying that the IP address is in a form characteristic to internal IP addresses;
 performing at least one of an IP address lookup and a reverse IP address lookup to ascertain whether the IP address correlates with a sender's domain name; and
 determining last IP address external to the recipient's system to facilitate spam detection.

44. The method of claim 43, the smoothing differs in at least one of the following aspects:
 the first smoothing comprises a different variance compared to the second smoothing with respect to a maximum entropy model; and
 the first smoothing comprises a different value of weight decay compared to the second smoothing with respect to a Support Vector Machine (SVM) model.

\* \* \* \* \*